United States Patent [19]

Liuzzo et al.

[11] Patent Number: 4,698,618

[45] Date of Patent: Oct. 6, 1987

[54] KEYBOARD WITH ARRAYS OF FUNCTION KEYS

[75] Inventors: James G. Liuzzo, St. Charles; William J. Proetta, Elburn, both of Ill.

[73] Assignee: American Telephone and Telegraph Company, AT&T Bell Laboratories, Murray Hill, N.J.

[21] Appl. No.: 912,213

[22] Filed: Sep. 25, 1986

Related U.S. Application Data

[63] Continuation of Ser. No. 606,946, May 4, 1984, abandoned.

[51] Int. Cl.⁴ .............................................. G08C 9/00
[52] U.S. Cl. .................................................. 340/365 R
[58] Field of Search ............ 340/365 R, 365 S, 365 Z, 340/365 VL, 711; 364/200

[56] References Cited

U.S. PATENT DOCUMENTS

| | | | |
|---|---|---|---|
| 3,380,031 | 4/1968 | Clayton et al. | 340/711 |
| 3,886,335 | 5/1975 | Hendricks | 340/365 R |
| 3,927,752 | 12/1975 | Jones et al. | 197/19 |
| 4,333,097 | 6/1982 | Buric et al. | 340/711 |
| 4,395,704 | 7/1983 | Kishimoto et al. | 340/365 R |
| 4,454,501 | 6/1984 | Butts | 340/365 R |
| 4,455,607 | 6/1984 | Watson et al. | 364/200 |
| 4,455,618 | 6/1984 | Walden et al. | 364/900 |

OTHER PUBLICATIONS

Two advertisements from Datamation, Mar., 1984: Ericsson, Alfastop, pp. 196-197; AT&T Teletype Corporation, 5620, back cover.

Brochure on DATAPOINT 8600 SERIES PROCESSORS, Datapoint Corporation.

R. Ahmari et al., "Automated Coin Toll Service: Softare" *The Bell System Technical Journal*, Figure 4, p. 1258, vol. 58, (No. 6) Part 1 of 2, Jul.-Aug., 1979.

Primary Examiner—James L. Rowland
Assistant Examiner—Brian R. Tumm
Attorney, Agent, or Firm—Werner Ulrich; Peter Visserman

[57] ABSTRACT

A keyboard for use with a terminal in a telephone operator assistance system is disclosed. The keyboard has a numeric array of keys that is surrounded on three sides by separate arrays of specialized function keys. The keyboard is arranged so that the most common keying sequence consists of the operation of a function key in the array to the left of the numeric array, the operation of keys in the numeric array, and the operation of a function key in the array to the right of the numeric array. This keyboard arrangement has been found experimentally to reduce operator work time. In addition, the keyboard contains a main array including alphabetic keys and miscellaneous function keys, and arrays of function keys to the left of and in back of the main array. The function keys are grouped in different arrays according to the type of function being performed, and the relationship of that function to the operation of keys in the numeric array.

2 Claims, 1 Drawing Figure

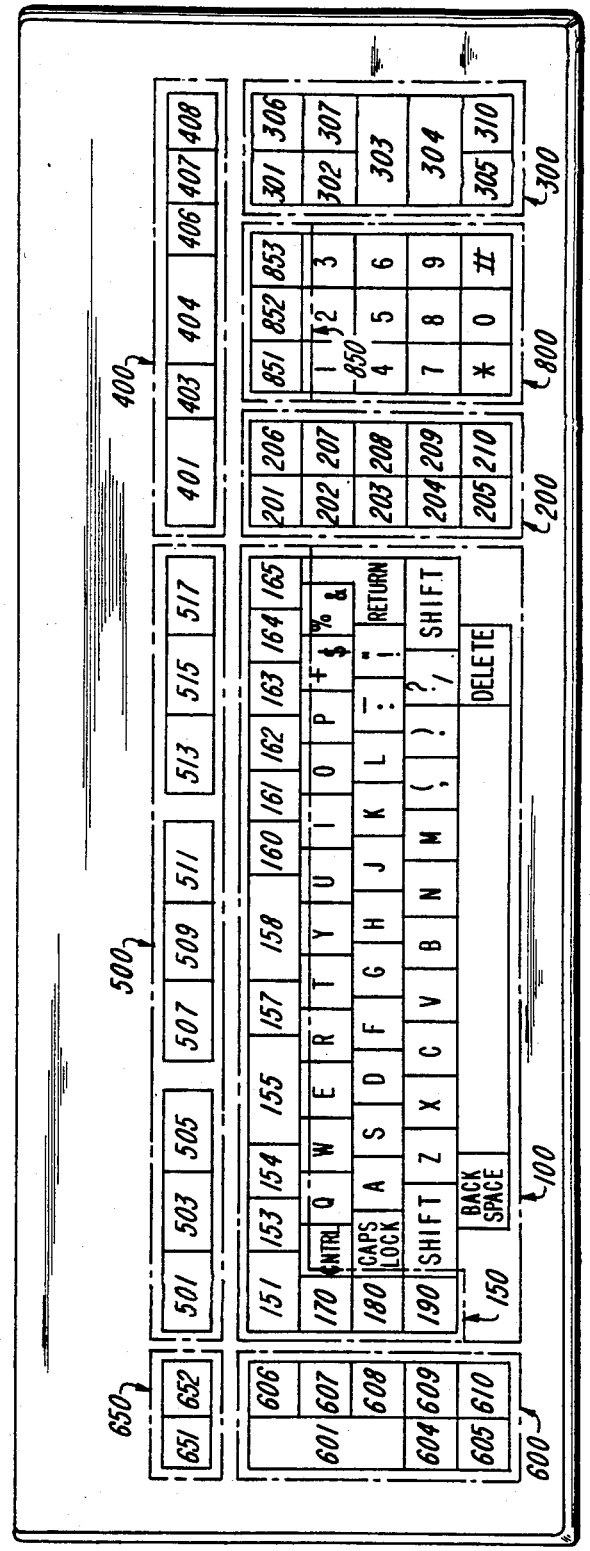

KEYBOARD WITH ARRAYS OF FUNCTION KEYS

CROSS-REFERENCE TO RELATED APPLICATION

This application is a continuation of abandoned application Ser. No. 606,946, May 4, 1984.

TECHNICAL FIELD

This invention relates to data entry and query for data processing and control systems and more specifically, to keyboards for terminals for entering data into or querying data from such systems.

BACKGROUND OF THE INVENTION

With the increasing use of data processing and control systems, the problem of creating or querying a data base in such systems has become increasingly significant. Data is frequently entered into a system or queried from a system via a terminal having a keyboard.

Great strides have been made in the development of keyboards engineered to improve the performance of the data entry process and to facilitate the querying process by operators or users. For example, many data entry keyboards which contain a main array of keys, typically including alphabetic keys, also contain a separate numeric array for entering numeric input. The numeric array has been provided because it is well recognized that most operators can enter numeric data more rapidly with the use of a numeric array controllable by a single hand.

Many of the more sophisticated data processing or control systems require interaction between an operator or user and the system. Keyboards for such applications have frequently been enhanced with the addition of special purpose function keys. For example, keyboards using special function keys are used in terminals for document search systems for making searches of case and statutory law. When using such keyboards, an operator may use special function keys to cause the document search system to display part of a document in a special format, to display another document, or to print a display.

Another type of keyboard for which extensive use of function keys is desirable is the keyboard for the terminal used by telephone operators in operator assistance systems. A terminal for use in such a system is shown in *The Bell System Technical Journal*, Vol. 58, No. 6, Part 1, July - August 1979, p. 1258. In such systems, the operator must handle many specialized telephone control functions, such as allowing a person-to-person call to complete or collecting a coin deposit. A request to perform one of these specialized telephone operator functions is signaled most expeditiously to a control processor of the operator assistance system with the help of a special function key provided on the keyboard.

Telephone operators also enter predominantly numeric data into the operator assistance system using keys in a numeric array in conjunction with the operation of function keys. While there has been some attempt to place function keys in groups, no successful overall optimum grouping of the function keys and optimum placement of such groups with respect to the numeric array has been achieved. As a result, the actions of operators are slowed down by the need for conscious thought and excessive hand and wrist movement back and forth between the numeric array and the special function keys. This results in errors and an unnecessarily high expense for operator data entry and data query operations.

SUMMARY OF THE INVENTION

In accordance with our invention, specialized function keys are grouped in arrays, including one array that is placed adjacent to and to the right of a numeric array of a keyboard. The separation between the arrays of specialized function keys and the numeric array is greater than the separation between adjacent keys of a row of the numeric array. Advantageously, this arrangement permits an easily sensed progression from a numeric keying action to the operation of a function key. Furthermore, it provides the operator a feel of certainty of location of the hand and allows for a rapid and seemingly automatic transition from numeric to function keys.

In accordance with one aspect of the invention, arrays of function keys, grouped according to function, are placed to the left of and to the right of the numeric array. Another array is placed in back of the numeric array, i.e., in the direction away from the operator with respect to the numeric array. The arrays are separated from each other by a distance substantially greater than the distance between adjacent keys of a row of the numeric array. Advantageously, function keys in the arrays adjacent to the numeric keyboard are used in conjunction with the keying in of numeric data to streamline the numeric data input process. This results in less groping for the right keys and results in faster action with fewer errors.

In accordance with one specific embodiment of the invention, a main array including alphabetic keys is also provided. Function key groups are placed within the main array, and function key arrays and groups of such arrays are placed to the left of and in back of the main array. These are in addition to the arrays to the left of, in back of, and to the right of the numeric array. The function keys to the left of, in back of, and within the main array are associated with functions which normally do not require numeric input.

In one application of such an embodiment, the function keys are used to carry out functions requested by an operator in a telephone operator assistance system. The arrays of function keys on either side of the numeric array have been selected to allow a natural left to right single hand progression from the operation of a left array function key, followed by operations of the numeric keys, followed by the operation of a right array function key. Similar functions are grouped wherever possible in the same array. The back rows of main and numeric arrays and the arrays of function keys on either side of and between them are aligned essentially in a straight line, as are the arrays located in back of the main and numeric arrays. Advantageously, such a keyboard arrangement has been shown under test conditions to reduce operator time required to handle a transaction. Furthermore, the functional grouping and the placement of arrays aids in allowing the user to become rapidly proficient in the use of the terminal. In addition, the use of a single hand for common numeric keying sequences reduces problems of coordinating operations of the two hands.

BRIEF DESCRIPTION OF THE DRAWING

The invention will be better understood from the following detailed description when read with reference to the drawing, which is a layout of the keys of an illustrative keyboard for use by a telephone operator in an operator assistance system.

DETAILED DESCRIPTION

The drawing shows the layout of a keyboard. In this illustrative embodiment, the keyboard is part of a terminal (not shown) for use by a telephone operator in an operator assistance system. Such a terminal, which also includes a video display, communicates with a control processor of the operator assistance system. The control processor receives data from and sends data to the terminal. The terminal sends alphanumeric data generated from the keyboard or data that represents the operation of function keys of the keyboard; operation of function keys may, for example, send data to request the processor to change the state of an operator call or to indicate the significance of subsequent alphanumeric data. The processor sends data to the terminal to control the video display.

Keys are arranged in arrays of one or more adjacent rows at least one of which consists of several adjacent keys. In other configurations, an array might have one or more adjacent columns at least one of which consists of several adjacent keys. An array group, for example, array group 500, consists of several functionally related but physically separated arrays. The term array group can also be applied to a single array, in which special case there is no physical separation.

The layout of the keyboard is designed to simplify the hand and wrist movements associated with keying information into the operator assistance system in order to reduce keying time and minimize keying errors. Consequently, several objectives have been met in assigning specific functions to each of the arrays of function keys. Because the keying of numbers is generally performed more rapidly on a numeric keyboard operated by a single hand, the numeric array 800 used for entering numbers is separate from the main array 100. Further, because in the telephone application numbers are rarely mixed with alphabetic text, it is not necessary in this application to duplicate the numeric keys in their normally assigned positions at the back of the main array 100. In addition, keys associated with similar functions are grouped together so that the operator can quickly learn to associate a general location on the keyboard with a type of function.

The distance between adjacent keys on one array is substantially less than that between nearest keys on neighboring arrays. For example, in this illustrative embodiment, the distance across the keyboard, measured between centers of adjacent keys on the numeric array is three quarters of an inch. This distance has been determined by measurements and tests to be a satisfactory interkey spacing for most operators. The distance between any key of one of the function key arrays and the nearest key on the main or numeric array is substantially greater. For example, the distance, measured across the keyboard, between the center of the "3" key on the numeric array 800, and the center of key 302 in the array 300 of functional keys to the right of the numeric array is one and one-eighth inches, which is one and one-half times as great as the interkey spacing. This greater separation keeps the function keys distinct, physically and in the operator's mind, and reduces the chance of operating a function key instead of a numeric key or vice versa. The back rows of arrays 600, 100, 200, 800 and 300 are aligned in a straight line. Array 650, array group 500 and array 400 are also aligned in another straight line. The distance between these arrays and array groups and the arrays in front of them is one and five-sixteenth inches. Aligning the arrays and array groups in this manner helps the operators to locate the arrays one with respect to another.

A few of the control keys (e.g., keys 302, 305, 307, 310) are referred to as macro keys. The operation of a macro key is equivalent to the ordered sequential operation of defined keys including alphabetic, numeric, and function keys. The definition of the keying sequence corresponding to each macro key is specifically adapted to each operator assistance system and is stored in the data base of the system. A macro key might be used, for example, to allow an operator to press a single key which represents a very frequently used numeric combination such as the area code of an adjacent geographic area, or which completely specifies a frequently encountered type of special billing code.

In the following description, captions of the function keys are presented and further explained. These captions use terms familiar to telephone operators. In these captions, the term "back" refers to the calling customer and connections to the calling customer. The term "forward" refers to the called customer and connections to the called customer. A call is charged to a "billing number," typically a credit card number or a telephone number. A connection is said to be "split" when all parties to the connection can no longer communicate with each other.

The function keys to the left of and to the right of the numeric array 800 are selected so that a normal numeric keying action consists of: operating a key in the array 200 to the left of the numeric array, keying the number on numeric array 800, and operating a key in the array 300 to the right of the numeric array. By keeping all of these operations under the control of a single hand, errors resulting from a failure to coordinate the sequence of operations between the left and the right hand can be avoided. The orderly left to right progression of keying operations improves keying performance.

Table 1 lists the identifying numbers, abbreviated captions, and meaning of the captions on the keys of array 200 to the left of numeric array 800. The keys in array 200 are normally operated just prior to the entry of numeric data. Operation of key 201 (forward third number) indicates that the subsequent number is that of a third party to be charged, specified by the called customer. Operation of key 202 (back third number) indicates that the subsequent number is that of a third party to be charged, specified by the calling customer. Operation of key 203 (special billing code number) is used to indicate a special class of call for billing purposes. Operation of key 204 (transfer) indicates that the subsequent number is the number to which the customer(s) are to be transferred. This might, for example, be the number of a repair bureau or that of another operator better able to handle that call. Operation of key 205 (carrier) indicates that the subsequent number is that of the preferred common carrier to carry this call. Operation of key 206 (forward card number) indicates that the subsequent number is the billing number of the called customer. Operation of key 207 (back card number) indicates that the subsequent number is the billing number of the calling customer. Operation of key 208 (forward number) indicates that the subsequent number is that of the called customer. Operation of key 209

(confer number) indicates that the subsequent number is that of a party to whom the operator wishes to talk. This might be used to confer with a selected assistant on how to handle an unusual call. Operation of key 210 (back number) indicates that the subsequent number is the number of the calling customer.

TABLE 1

| KEY IDENTI-FICATION | ABBREVIATION | FULL DESIGNATION OR DESCRIPTION |
|---|---|---|
| 201 | FWD 3rd # | Foward Third Party Billing Number |
| 202 | BK 3rd # | Back Third Party Billing Number |
| 203 | BLG CODE # | Special Billing Code Number |
| 204 | TRANS | Transfer |
| 205 | CARRIER | Carrier Number |
| 206 | FWD CARD # | Foward Party Billing Number |
| 207 | BK CARD # | Back Party Billing Number |
| 208 | FWD # | Foward Number |
| 209 | CONFER # | Confer Number |
| 210 | BK # | Back Number |

Table 2 lists the identifying numbers, abbreviated captions, and meaning of the captions on keys of array 300. The keys in this array include keys operated after numeric data has been keyed, plus a few miscellaneous functions frequently invoked after a numeric keying sequence has been completed. Operation of key 301 (access) indicates that the telephone operator wishes to be connected to the next partial connection with which the position is still currently associated. This might be that of a call previously placed on hold by the operator. Keys 302, 305, 307, and 310 are macro keys of the type referred to earlier. Operation of key 303 (enter) indicates the end of a keyed number. Operation of key 304 (send) indicates that the number previously keyed is that of a destination and that the operator assistance system may take steps toward setting up a connection to that destination. Note that the send key 304 and the enter key 302, both in the array 300 to the right of the numeric array, are operated after a number has been keyed. Also, they are both of double width to make them especially easy to locate and operate since these keys are operated so frequently. Operation of key 306 (supervisory assistance) asks for supervisory assistance and will cause a supervising operator to be connected.

TABLE 2

| KEY IDENTI-FICATION | ABBREVIATION | FULL DESIGNATION OR DESCRIPTION |
|---|---|---|
| 301 | ACS | Access Next Connection |
| 302 | (M) | Macro (Specifiable) |
| 303 | ENTER | End of numeric entity |
| 304 | SEND | Send Call Set-up Signals |
| 305 | (M) | Macro (Specifiable) |
| 306 | SA | Supervisory Assistance |
| 307 | (M) | Macro (Specifiable) |
| 310 | (M) | Macro (Specifiable) |

Numeric array 800 includes the ten numerals 0,1, ... , 9, the "star" and "pound" signs found on modern telephone key pads, and a group 850 of three function keys 851, 852 and 853. These latter function keys are macro keys. The macro functions assigned to these keys are those associated with numeric keying operations, for example, for keying in a frequently called area code. Alternatively, in a numeric array for a keyboard for use by a telephone operator, the standard alphabetic captions may also be placed on the numeric keys to handle cases where a credit card or telephone number is not completely numeric. In such a numeric array, the caption on the "5" key, for example, would also include the letters "JKL".

Table 3 lists the identifying numbers, abbreviated captions, and meaning of the captions on the keys in array 400, placed in back of numeric array 800. Most of these keys are associated with a type of telephone charge. The operation of one of these keys frequently precedes the entry of numeric data. Moreover, sometimes one of these keys is operated after the typical numeric data entry sequence described above, has already begun. Under these circumstances, it is especially desirable to place array 400 so that it is also controllable by the right hand. Operation of key 401 (person) indicates that this is a person-to-person call and should be charged accordingly. Operation of key 403 (paid) indicates that this is a normal call in which the calling customer pays. Operation of key 404 (collect) signifies that this is a call in which the called party pays. Key 406 is a macro key of the type referred to earlier. For example, operation of this key might specify a complete special billing code and would be equivalent to operating key 203 (special billing code number), operating the appropriate numeric keys, and operating key 303 (enter). Operation of key 407 (no AMA) signifies that no automatic message accounting record is to be made for this call and that the call is therefore to be a free call. Operation of key 408 (DDD) indicates that this call is to be charged at the normal customer-dialed (DDD) rate and not at the operator-assistance rate.

TABLE 3

| KEY IDENTI-FICATION | ABBREVIATION | FULL DESIGNATION OR DESCRIPTION |
|---|---|---|
| 401 | PERSON | Person-to-Person charge |
| 403 | PAID | Paid by calling party |
| 404 | COL | Collect call |
| 406 | (M) | Macro (Specifiable) |
| 407 | NO AMA | No AMA Record (free call) |
| 408 | DDD | Charge regular customer dialed rate |

Table 4 lists the identifying numbers, abbreviated captions, and meaning of the captions on the keys in arrays 600 and 650 placed to the left of the main array 100. The function keys in array 600, normally operated by the left hand, are used for voice path and call connection control. Because operation of one of these keys is not normally associated with the keying of numeric data, operation of these keys by the left hand does not require coordination with right hand numeric keying operations. Since all function key arrays cannot be placed near the numeric array, this array is a sound choice for placement away from the numeric array. Operation of key 601 (position release) releases an operator from a transaction and connection. Since this key is pressed so frequently, it occupies three positions to make its access especially easy and rapid. Operation of key 604 (volume up) increases the level of the voice connection. Operation of key 605 (volume down) reduces the level of the voice connection. Operation of key 606 (record ticket) is used to indicate that a charging record should be prepared now. Operation of key 607 (hold) is used to indicate that a customer connection should be placed on hold so that the operator subsequently can return to the connection. Operation of key 608 (hand-off) is used to disconnect the operator from an operator-call connection with an auxiliary operator, such as a supervisor. Operation of key 609 (split forward) temporarily breaks the voice connection to the called customer. Operation of key 610 (split back) temporarily breaks the voice connection to the calling customer. This key might be used, for example, while the operator is verifying a third party billing number call.

Operation of keys 651 and 652 (window 1 and 2) in array 650, which is placed in back of array 600, controls windowing actions for specialized displays. Separate data may be displayed on the left and right sides (windows) of the video display. Operation of key 651 changes the page of data being displayed on the left side, and operation of key 652 changes the page of data being displayed on the right side. One of the sides of the screen may display current administrative messages during idle times, or when the operator is handling certain stages of a call; operation of a window key causes alternate data, such as call related data, to be displayed instead. Here, also, operation of one of these keys by the left hand need not be coordinated with right hand keying operations.

TABLE 4

| KEY IDENTIFICATION | ABBREVIATION | FULL DESIGNATION OR DESCRIPTION |
| --- | --- | --- |
| 601 | POL RLS | Position Release (end of call transaction) |
| 604 | VOLUME UP | Increases the volume of the connection |
| 605 | VOLUME DOWN | Reduces the volume of the connection |
| 606 | REC TKT | Record Ticket (enter AMA record) |
| 607 | HOLD | Hold present connection |
| 608 | HAND OFF | Disconnect from present 3-way connection |
| 609 | SPLIT FWD | Split connection: forward party removed |
| 610 | SPLIT BK | Split connection: back party removed |
| 651 | W1 | Window 1 |
| 652 | W2 | Window 2 |

Keys 501, 503, ..., 517 in array group 500 are variable function keys, sometimes called "soft keys" whose functions are defined in the program of the control processor of the system, and whose captions are displayed on the video display. The variable function keys are placed in back of the main array 100 and close to the corresponding captions, and are grouped in three arrays of three keys each, to correspond to the arrangement of the captions, In the present embodiment of the invention, six groups of key captions and functions are used. One exemplary group is used in connection with coin calls and includes a number of functions such as coin collect and coin return especially appropriate for handling coin calls. Another group of captions is used for such specialized functions as the opening of a display position by an operator and the adjustment of the brightness of a display screen.

Table 5 lists the identifying numbers, abbreviated captions, and meaning of the captions on the keys in group 150 of the main array 100. Most of these keys are in the back row of the main array. These keys include all function keys not placed in one of the other arrays, and are not as a group associated with specific types of keying operations. Operation of key 151 (cancel call), which occupies two positions to make it easy to access that key, simply cancels the call and deletes called customer data for that call. Keys 153, 154, 157, 160 and 164 are spare keys, available for assignment as needed. Operation of key 155 (emergency) causes the system to alert office management that an emergency call is being handled by the operator. Operation of key 158 (soft key scroll) is used to alter the selection of functions to be invoked by operation of the variable function keys in array group 500. Keys 155 and 158 are double width to reduce errors in accessing these keys. Operation of key 161 (details) allows the operator to add important remarks about a call to the call ticket. Remarks would be entered using the alphabetic (array 100) and numeric (array 800) keys. For example, these remarks might indicate the calling customer's address, or that he has a hearing difficulty. Operation of key 162 (forward name) allows the operator to add the called customer's name to the call ticket. Operation of key 163 (back name) allows the operator to add the calling customer's name to the call ticket. Operation of key 165 (make busy) makes an operator position busy in case the operator is not prepared to accept any further calls. This key would be operated prior to shutting down a position. Operation of key 170 (release forward) is used to release the forward connection. Operation of key 180 (release confer) is used to release the confer connection. Operation of key 190 (release back) is used to release the back connection.

TABLE 5

| KEY IDENTIFICATION | ABBREVIATION | FULL DESIGNATION OR DESCRIPTION |
| --- | --- | --- |
| 151 | CA CALL | Cancel (delete) back party call data |
| 153 | — | Spare |
| 154 | — | Spare |
| 155 | EMERG | Call being handled is an emergency |
| 157 | — | Spare |
| 158 | Soft Key Scroll | Change "soft key" assignment |
| 160 | — | Spare |
| 161 | DETAILS | Entry of remarks into call ticket |
| 162 | FWD NAME | Entry of called customer's name |
| 163 | BK NAME | Entry of calling customer's name |
| 164 | — | Spare |
| 165 | MAKE BUSY | Make operator position busy |
| 170 | FWD | Release forward connection |
| 180 | RLS CONFER | Release confer connection |
| 190 | RLS BK | Release back connection |

The present embodiment of the invention is useful for keyboards for telephone operators in modern operator assistance systems. However, the principles of the invention embodied in this keyboard can be applied to other types of data entry and data query systems. For example, it is desirable in any such system in order to optimize operator performance to have the function keys which precede numerical data input to the left of the numeric array and to have the functions which follow the keying in of a numerical field to the right of the numeric array. This permits an orderly flow of keying operations from left to right and allows the same hand to control all of these operations. For functions which are associated with numeric input or are called in the middle of the entry of numeric information, an array of function keys may be placed in back of the numeric array. Other function keys may be placed to the left of and in back of the main array. Function keys which are used especially often are sometimes made larger so that they are easier to find.

It is to be understood that the above-described embodiment is merely illustrative of the principles of this invention; other arrangements may be devised by those skilled in the art without departing from the spirit and scope of the invention.

What is claimed is:

1. A keyboard for a terminal for use by a telephone assistance operator for communicating with a processor of an operator assistance system comprising:

a main array of keys comprising a plurality of alphabetic keys and a plurality of function keys representing functions including the function of identifying subsequently keyed alphabetic data, said alphabetic keys arranged in the configuration of a QWERTY keyboard;

an array of numeric keys located to the right of said main array comprising a plurality of rows of numeric keys and function keys representing functions including the function of entering a frequently used sequence of numbers, and having an inter-key distance measured by the distance between centers of adjacent numeric keys of one of said rows of said array of numeric keys;

a first array of keys comprising a plurality of function keys, located adjacent to the left of said array of numeric keys and to the right of said main array, separated from said main array and said array of numeric keys by an inter-array distance, inter-array distances between two arrays being measured by the shortest distance between the center of a key of a first of said two arrays and the center of a key of a second of said two arrays, greater than said inter-key distance, comprising function keys representing functions usually keyed immediately before a number is keyed using said array of numeric keys;

a second array of keys comprising a plurality of function keys located adjacent to the right of said array of numeric keys and separated from said array of numeric keys by an inter-array distance greater than said inter-key distance, comprising function keys representing functions, including the function of initiating the setting up of a connection to a communication terminal identified by a telephone number previously keyed, usually keyed immediately after a number is keyed using said array of numeric keys;

a third array of keys, comprising a plurality of function keys, located to the left of said main array and separated therefrom by an inter-array distance greater than said inter-key distance;

an array group of keys, comprising a plurality of variable function keys, located behind said main array and separated therefrom by an inter-array distance greater than said inter-key distance;

wherein said main array further comprises a control key for controlling change of functions of said plurality of variable function keys; and wherein each of said main array, said first, second, and third arrays, and said array of numeric keys has a back row of keys, and wherein the back row of said third array, said main array, said first array, said array of numeric keys, and said second array are aligned in a straight line;

whereby said array of numeric keys and said first and second arrays are positioned so that they can be readily accessed by the right hand of said telephone assistance operator.

2. A keyboard for a terminal for use by a telephone assistance operator for communicating with a processor of an operator assistance system comprising:

a main array of keys comprising a plurality of alphabetic keys and a plurality of function keys representing functions including the function of identifying subsequently keyed alphabetic data, said alphabetic keys arranged in the configuration of a QWERTY keyboard;

an array of numeric keys located to the right of said main array comprising a plurality of rows of numeric keys and keys representing functions including the function of entering a frequently used sequence of numbers, and having an inter-key distance measured by the distance between centers of adjacent numeric keys of one of said rows of said array of numeric keys;

a first array of keys comprising a plurality of keys representing functions, including the function of identifying subsequently keyed numeric data, usually keyed immediately before a number is keyed using said array of numeric keys, located adjacent to the left of said array of numeric keys and to the right of said main array, separated from said main array and said array of numeric keys by an inter-array distance, measured by the shortest distance between the center of a key of a first of two arrays and the center of a key of the second of two arrays, greater than said inter-key distance;

a second array of keys comprsing a plurality of keys representing functions, including the function of initiating the setting up of a connection to a telphone station associated with a directory number previously keyed, usually keyed immediately after a number is keyed using said array of numberic keys, located adjacent to the right of said array of numeric keys and separated from said array of numeric keys by an inter-array distance greater than said inter-key distance;

a third array of keys, comprsing a plurality of function keys, including keys representing functions usually performed at the beginning and end of a call, located to the left of said main array and separated therefrom by an inter-array distance greater than said inter-key distance;

a fourth array of keys comprising a plurality of keys representing functions, including the function of identifying a class of charge for a call, located behind said array of numeric keys and separated therefrom by an inter-array distance greater than said inter-key distance;

an array group of keys, comprising a plurality of variable function keys, whose functions can be changed under the control of other keys of said keyboard, located behind said main array and separated therefrom by an inter-array distance greater than said inter-key distance; and a fifth array of keys, comprising a plurality of function keys in one row, located behind said third array of keys and separated therefrom by an inter-array distance greater than said inter-key distance, and located in a line with said array group of keys;

wherein said main array further comprises a control key for controlling change of functions of said plurality of variable function keys;

wherein each of said main array, said first, second, and third arrays, and said array of numeric keys has a back row of keys, and wherein the back row of said third array, said main array, said first array, said array of numeric keys, and said second array are aligned in a straight line;

whereby said array of numeric keys and said first and second arrays are positioned so that they can be readily accessed by the right hand of an operator.

* * * * *

UNITED STATES PATENT AND TRADEMARK OFFICE
CERTIFICATE OF CORRECTION

PATENT NO. : 4,698,618

DATED : October 6, 1987

INVENTOR(S) : James G. Liuzzo, William J. Proetta

It is certified that error appears in the above-identified patent and that said Letters Patent is hereby corrected as shown below:

Column 9, line 29, change "distanee" to --distance--;

Column 10, line 37, change "comprsing" to --comprising--.

Column 10, line 42, change "numberic" to --numeric--.

Column 10, line 47, change "comprsing" to --comprising--.

Signed and Sealed this

Fifteenth Day of March, 1988

Attest:

DONALD J. QUIGG

Attesting Officer

Commissioner of Patents and Trademarks